J. Sargent,
Permutation Lock,
Nº 85,245. Patented Dec. 22, 1868.

Witnesses:
J. A. Davis
W. J. Creelman

Inventor:
Jas. Sargent
By L. Fraser & Co
Atty.

UNITED STATES PATENT OFFICE.

JAMES SARGENT, OF ROCHESTER, NEW YORK.

IMPROVEMENT IN PERMUTATION-LOCKS.

Specification forming part of Letters Patent No. 85,245, dated December 22, 1868.

*To all whom it may concern:*

Be it known that I, JAMES SARGENT, of the city of Rochester, in the county of Monroe and State of New York, have invented a certain new and useful Improvement in Combination-Locks; and I do hereby declare that the following is a full and exact description thereof, reference being had to the accompanying drawings, making part of this specification.

Figure 1:
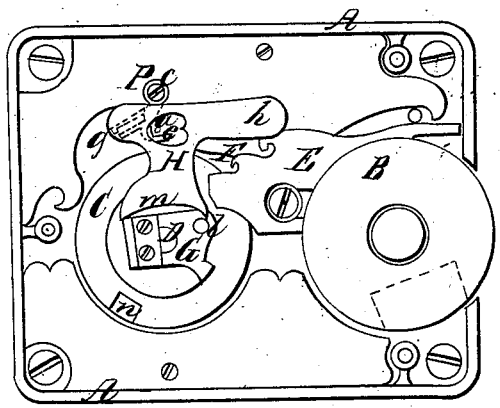
Figure 2:
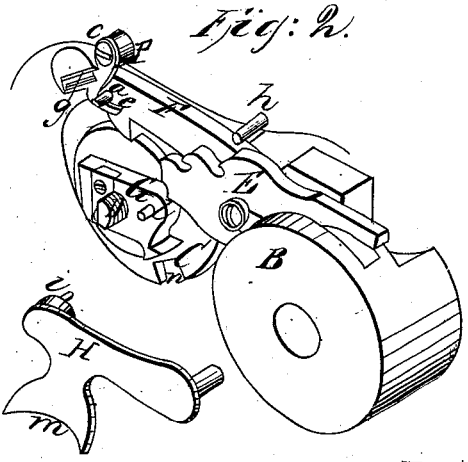

Figure 1 is an elevation of my improved lock, with the back plate removed to show the interior; and Fig. 2 a perspective view of the operating parts detached.

Like letters of reference indicate corresponding parts in both figures.

The object of this invention is to connect with the dog that falls into the notches of the tumblers an arrangement of parts that will elevate and retain the same from contact with the tumblers in all positions of the lock.

In the accompanying drawings, A indicates the lock-case; B, the turning-bolt; C C, the tumblers; D, the spindle; G, the cam attached to the spindle, by which the parts are operated; and E, the ratchet-bar for throwing the bolt, to which is jointed the dog-lever F. This arrangement is substantially the same as that patented to me August 28, 1866.

One end of the dog F has a projecting stud, $a$, with which engages a device hung in such a way, as when striking under the stud, it elevates the dog. I prefer that shown in the drawings, consisting of a pawl, P, pivoted at $c$, which is provided with a hook, $e$, that strikes under the stud.

The pawl P is actuated and held by means of an arm, H, provided with pin or bearing $i$ at one end, that rests in slot $g$ of the pawl, and is pivoted at its opposite end to the lock-case at $h$. This arm has also a curved bearing, $m$, against which strikes cam-pin $l$, when the cam G is turned around, thus raising arm H and withdrawing the pawl P gradually from under stud $a$, and allowing the dog F to drop into notches $n\ n$, when the tumblers are properly set.

By this means the dog F is held elevated from the periphery of the wheels C at all times, except when the cam-projection $l$ raises the arm H, at which time the pawl P is momentarily disengaged from dog F, which is necessarily the case in order to allow the dog to fall into the notches when the combination is set.

The bearing $m$ is preferably made of the curved form shown, so as to allow the arm H a gradual rise and fall, as it is operated by cam-projection $l$, for if the arm were allowed to fall suddenly the sound might enable one to ascertain the position of the wheels. My arrangement completely obviates all difficulty of this kind.

A device patented November 26, 1867, No. 71,373, has a pendent lever that serves to hold the dog elevated by means of its own weight, and is operated by means of a cam that swings it out away from the dog to disconnect it.

The objection to this is, that the weight, by hanging freely and acting by its own gravity, is only effective when the safe is in the upright position; but when tipped up sidewise, the weight being self-acting, will swing rapidly out away from the dog and disconnect the parts, and allow the dog to rest upon the wheels, thus failing in the object for which it is intended. A further objection is, it swings back suddenly, thus producing a click by which the position of the wheels might be ascertained.

These objections are obviated in my arrangement, for the pawl P is not a weight, but acts in obedience to the arm H, which holds it in all positions by positive force. If the safe, to which the lock is attached is tipped up this pawl cannot swing off from contact with the stud of the dog, but will always hold it up unless it is desired to release it; and there can be no sudden fall of the parts when released by the cam, for the bearing $m$ follows down gradually on the cam-pin $l$, and thus produces a similar effect of the hook $e$ upon the stud $a$.

It is manifest that the parts P and H may be modified in form and arrangement without altering the principle of the invention.

What I claim as my invention, and desire to secure by Letters Patent, is—

The combination of the pawl P or its equivalent, and arm H with the dog F, for the purpose of retaining the dog elevated in all positions of the lock, as herein set forth.

In witness whereof I have hereunto signed my name in the presence of two subscribing witnesses.

JAS. SARGENT.

Witnesses:
 WM. J. CREELMAN,
 T. E. BATTERSON.